Dec. 25, 1962　　　　E. C. HORTON　　　　3,070,183
DOOR LOCKING SYSTEM FOR MOTOR VEHICLES
Filed July 9, 1958　　　　　　　　　　　2 Sheets-Sheet 1
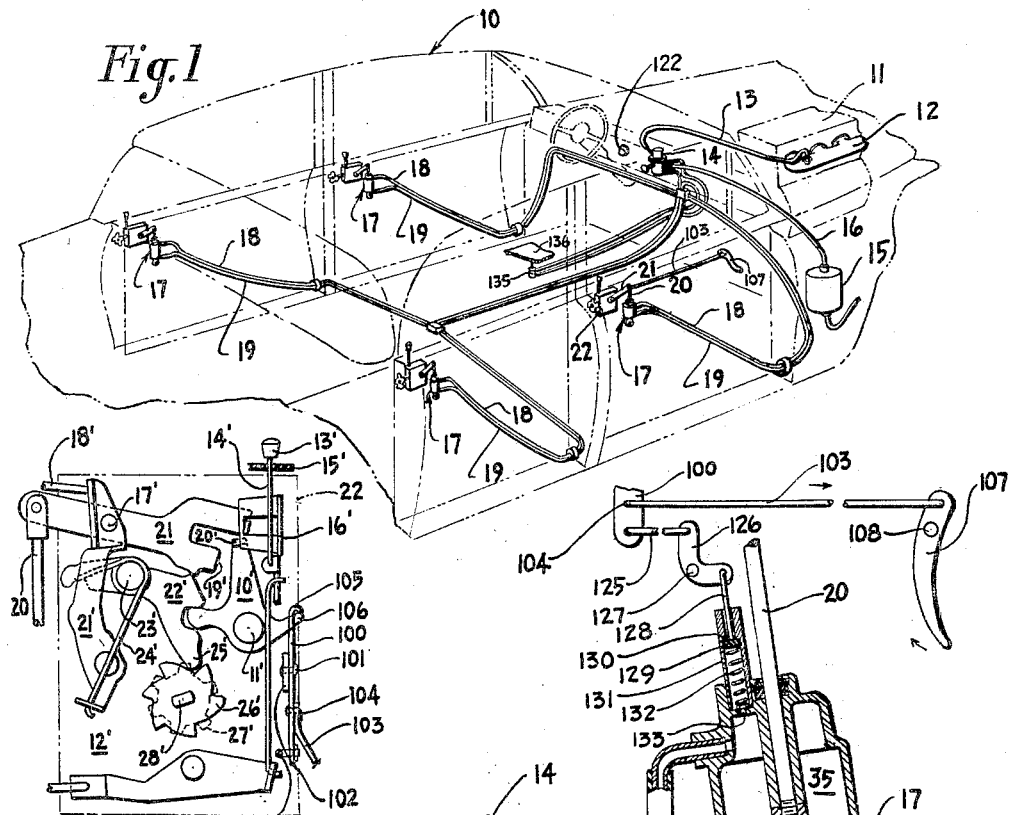
Fig. 1
Fig. 5
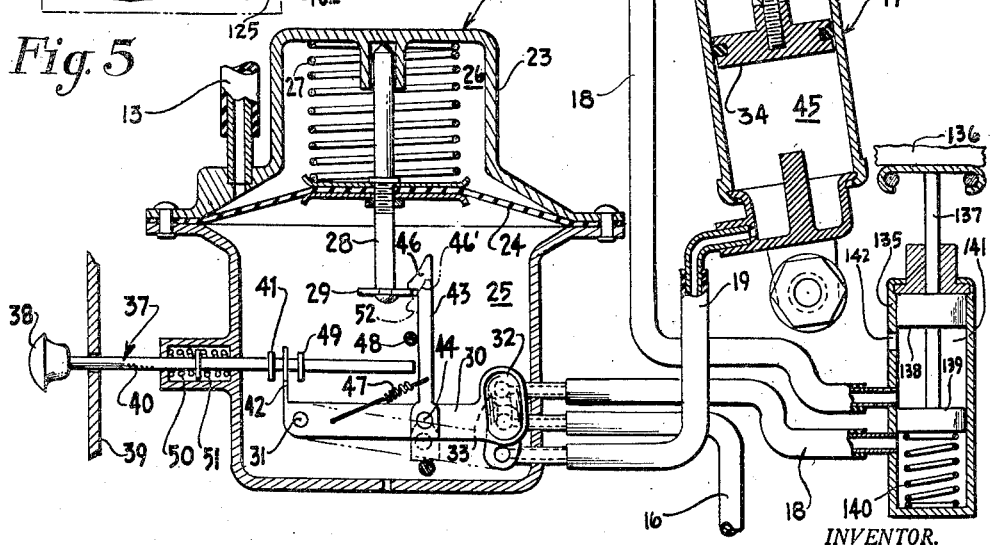
Fig. 2
INVENTOR.
ERWIN C. HORTON
BY
Bean Brooks Buckley + Bean
ATTORNEYS Dec. 25, 1962  E. C. HORTON  3,070,183
DOOR LOCKING SYSTEM FOR MOTOR VEHICLES
Filed July 9, 1958  2 Sheets-Sheet 2

INVENTOR.
ERWIN C. HORTON
BY
Bean Brooks Buckley & Bean
ATTORNEYS

United States Patent Office 3,070,183
Patented Dec. 25, 1962

3,070,183
DOOR LOCKING SYSTEM FOR MOTOR VEHICLES
Erwin C. Horton, Hamburg, N.Y., assignor to Trico Products Corporation, Buffalo, N.Y.
Filed July 9, 1958, Ser. No. 747,496
6 Claims. (Cl. 180—82)

This invention relates to motor vehicle door locking arrangements and more particularly to simplified devices which not only automatically maintain the doors of a vehicle locked against unauthorized intrusion but also permit remote controlled operation of the vehicle door locks.

To prevent unauthorized intrusion, it is desirable for the doors of an automobile to be locked immediately as an incident of the starting of the vehicle without any requirement for deliberate thinking on the part of the operator. Furthermore, it is also desirable to be able to lock and unlock the doors of a vehicle from a central location to thereby avoid the discomfort and inconvenience of locking and unlocking each of the doors individually. Heretofore certain classes of door locking systems have automatically locked the doors of a vehicle only upon the initial starting of the automobile engine. It is desirable for optimum operation of a door locking system that the doors not only automatically lock as an incident of the starting of the vehicle but also that they automatically relock themselves after they have been unlocked without any requirement for deliberate thinking on the part of the vehicle operator. This relocking action not only includes the first situation where an occupant has left the vehicle which has its engine in operation, but also the second situation where one of the vehicle doors is not closed until after the engine is started. In the second situation, the closing of an open latch-locked door will normally cause it to become unlocked, notwithstanding that previous types of locking arrangements may have placed the latch lock of the open door in a locked condition on the initial starting of the vehicle engine. The advantage of the mode of operation of the present invention is that a multiple automatic latch-locking is provided whereby the vehicle is protected at all times against unauthorized intrusion. It is with achieving all of the foregoing desirable objectives in an efficient manner by the use of simple and fully automatic devices that the present invention is concerned.

It is accordingly the primary object of the present invention to provide a vehicle door locking system which is capable of automatically relocking the doors of an operating vehicle after they have been unlocked and without any requirement for positive action on the part of the vehicle operator.

It is another important object of the present invention to provide a combination locking and unlocking arrangement for vehicle doors which not only automatically maintains the doors of a vehicle locked whenever the vehicle is in operation without any requirement for positive thinking on the part of the operator but also permits locking and unlocking of the vehicle doors from a central location.

A further object of the present invention is to provide a multiple automatic latch-locking system for a vehicle which insures that all of the vehicle doors are locked even if the vehicle operator starts the engine before the operator's door or a passenger's door is closed. This operation prevents the placing of the locked latch-lock in a permanent unlocked condition when it is subsequently engaged by the latch retainer on the door jamb, thereby precluding the door closing action from cancelling the first automatic latch locking which was effected on the initial starting of the vehicle engine.

Another object of the present invention is to provide an improved locking arrangement for vehicle doors which, once actuated from a suitable power source, does not require or consume power for its retention in its actuated position.

A further object of the present invention is to provide one form of the invention which, in addition to achieving all of the foregoing objects, permits the locking of all the vehicle doors by merely momentarily turning the ignition key to an "on" position.

A still further object of the present invention is to provide a door locking system for a vehicle which prevents opening of the vehicle doors by the use of the outside door handle but which permits opening of the vehicle doors by the manipulation of the inside door handles without interference from the automatic locking arrangement.

Another object of the present invention is to provide a door locking system for a vehicle which includes a signal arrangement for indicating whenever the door locks are in an unlocked condition, as in an accidental or inadvertent unlocking of a rear door, to thereby provide the driver with a warning that the door is being unlatched.

Yet another object of the present invention is to provide an improved lock actuating arrangement which permits the remote unlocking of the vehicle doors when the automobile ignition key is in the "off" position, this being desirable when it is required to unlock the doors after the ignition has been turned off, prior to alighting from the vehicle. Other objects and attendant advantages of the present invention will readily be perceived hereafter.

In one form the present invention relates to a system employing fluid pressure for automatically relocking the vehicle doors in the event they are opened and closed while the engine is running, without any requirement for deliberate thinking on the part of the operator. In accordance with this form of the invention, a fluid pressure valve is provided which is responsive to manifold vacuum for automatically actuating a fluid pressure motor which moves the latch locks to a locked position when the first increase in manifold vacuum is experienced after the first reduction of manifold vacuum incidental to the initial surge of vehicle acceleration. Furthermore, the above mentioned valve also permits remote actuation of the latch locks from the operator's position to either cause the doors to unlock or lock, as desired. In the event the vehicle operator should fail to lock the doors by use of this remotely positioned valve while the vehicle engine is operating, the system will operate as described above to provide automatic relocking of the vehicle doors. Furthermore, the present invention includes a multiple automatic latch locking aspect in that it not only locks closed vehicle doors in response to the operation of the engine, as set forth above, but also insures that a door which is not closed when the vehicle engine is started is locked automatically subsequent to the closing thereof.

In accordance with the mode of operation of the door locking system, the doors can obviously not be opened by the manipulation of the outside door handle when the system is in operation. However, many times it is desirable to permit opening of the vehicle doors by the manipulation of the inside door handles, as when a passenger desires to alight from the vehicle. To facilitate this type of operation, the system is so constructed that the door locking motor associated with the particular door to be opened is rendered ineffective when the inside door handle is manipulated to a door unlocking position in order to prevent the motor from interfering with unlocking operation of the door lock. When the door handle is released the door locking motor returns to its operative position where it locks the vehicle door. As an added safety feature, a signalling device is incorporated into the door locking system to indicate to the operator of the vehicle whenever any of the doors are unlocked. This form of the present invention will be more fully understood hereafter.

In accordance with another form of the present invention, a combination improved door locking arrangement is provided wherein an electric circuit is automatically completed to door locking motors on the closing of the ignition switch of the vehicle, thereby insuring that the doors are locked against unauthorized intrusion without any requirement for deliberate thinking on the part of the operator. Furthermore, once the doors are locked, switch means in the circuit automatically stop the flow of current to the motors, thereby obviating the waste of electric energy. A second circuit is also provided for unlocking the doors by the use of a switch which is within convenient reach of the operator. The switch is operative to perform its intended function regardless of whether the vehicle ignition is on or off. This permits the doors to be unlocked from the operator's position after the vehicle has been parked and the ignition has been turned off. However, if the ignition switch is not turned off, the door locking arrangement causes the doors to automatically relock when the switch is released. In the event it is desired to lock the vehicle doors while the vehicle is parked with the ignition off, the above mentioned door locking circuit may be energized by merely turning the ignition switch "on" momentarily without actually starting the engine. This embodiment also is constructed to permit the opening of the vehicle doors from the inside of the vehicle by the manipulation of the inside door handles notwithstanding that the doors are locked against entry from outside of the vehicle.

The present invention is depicted as being applied to doors utilizing latch-locking mechanisms which are conducive to the installation of the intrusion guard system with a minimum of effort and expense. However, it will be appreciated that other types of locks may be used within the scope of certain of the appended claims.

All of the aspects of the various embodiments of the present invention will be more fully understood when the following portions of the specification are read in conjunction with the accompanying drawings wherein:

FIG. 1 is a schematic perspective view of an automobile containing a fluid pressure door locking arrangement in accordance with the principles of the present invention;

FIG. 2 is a view, partly in cross section, depicting the salient features of the construction of FIG. 1;

FIG. 5 is a view of a latch-lock structure which may be utilized with the present invention.

Figure 3:
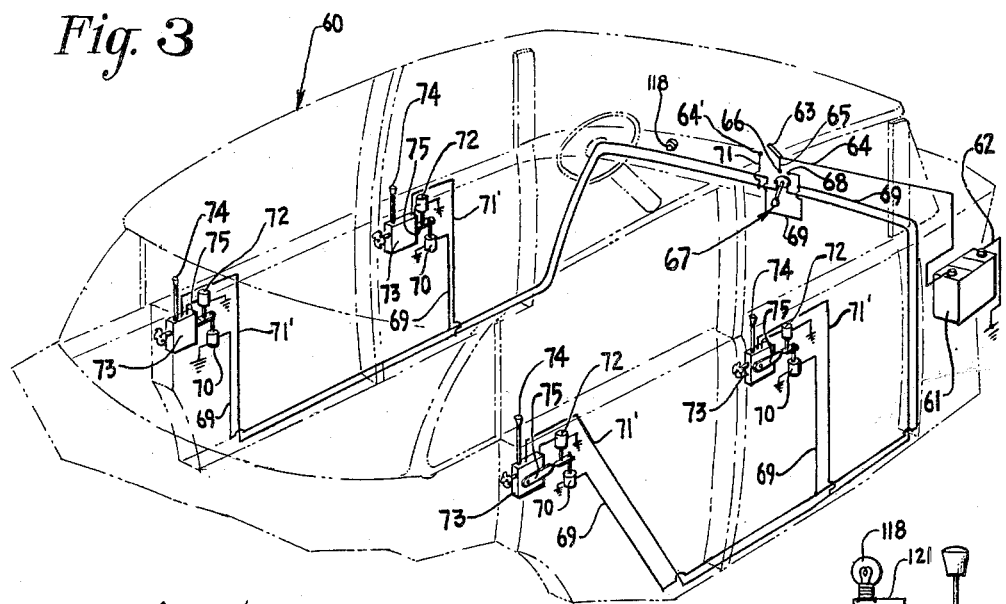
FIG. 3 is a schematic perspective view of an automobile containing an electrical door locking arrangement in accordance with the principles of the present invention.

Reference is now made to FIGS. 1 and 2 which depict the fluid pressure operated automatic relocking system of the present invention. Depicted in phantom is a vehicle body 10 having an engine 11 which has the usual intake manifold 12. A conduit 13 (FIGS. 1 and 2) couples manifold 12 to master control 14. As can be seen from the drawing, a vacuum tank 15 of suitable construction is mounted on the vehicle and is coupled to master control 14 by conduit 16 (FIGS. 1 and 2).

Mounted within each of the vehicle doors is a fluid pressure motor 17 having a double acting piston and cylinder arrangement (FIGS. 1 and 2) for actuating door latch-locking mechanism 22 (FIG. 5). Motor 17 is coupled to vacuum tank 15 through suitable conduits 18 and 16 or 19 and 16, as described hereafter. The shaft 20 of fluid pressure motor 17 is suitably attached to lever 21 (FIG. 5) of the door latch-locking mechanism 22.

From FIG. 5 it can be seen that the door latch-locking mechanism 22 includes a bell crank lever 10' which is pivotally mounted by pin 11' on housing 12'. The conventional manual door locking and unlocking pin 13' having a shaft 14' is adapted to extend through the molding 15' of the vehicle door to actuate link 16' in a vertical direction. The movement of pin 13' upwardly to an unlocking position will cause a corresponding movement of link 16' upwardly which will cause lever 21 to pivot in a counter-clockwise direction about pin 17' which is mounted between lever 21 and lever 21'. After lever 21 has been pivoted, the movement of pin 18' to the right, as occurs when the door handle (not shown) on the outside of the vehicle is manipulated, will cause end 19' of lever 21 to abut flange 20' of bell crank lever 10' to cause it to pivot in a clockwise direction. This will cause lever 22' to pivot counterclockwise about pin 23' (which is mounted on housing 12') against the bias of spring 24'. When this occurs, tongue 25' of lever 22' will be moved away from ratchet wheel 26' which is coaxially mounted with rotary latch 27' on shaft 28' to thereby permit opening of the vehicle door. As shown in FIG. 5, the latching assembly 22 is in the locked position (with lever 21 rotated clockwise from its unlocking position) so that the manipulation of a door handle (not shown) on the outside of the door will cause pin 18' and lever 21 to move to the right, but the end 19' of lever 21 will miss flange 20' of lever 10' thereby preventing actuation of the above described linkage which unlocks the door. A more detailed description of the above described latch will be found in application Serial No. 685,462, filed September 23, 1957. However, it is deemed that a more detailed description of this latch for purposes of this invention is unnecessary, it being merely necessary to observe that when the left end of lever 21 is in its uppermost position the door is locked and when it is in its lowermost position, the door is unlocked.

Master control mechanism 14 consists of a housing 23 which is partitioned by flexible latch-locking diaphragm 24 into chambers 25 and 26. Conduit 13 causes chamber 26 to communicate with the engine manifold 12. When chamber 26 experiences high manifold vacuum, diaphragm 24 is pulled upwardly against the bias of spring 27. This diaphragm is always in balance between the opposing forces exerted by spring 27 and the manifold vacuum. Suitably affixed to diaphragm 24 is a latch rod 28 having a latching disc 29 affixed to the end thereof.

Pivotally mounted within housing 23 is a bell crank lever 30 which pivots about pin 31. Mounted on one end of one of the legs of bell crank lever 30 is a vacuum distributor valve 32 having a recess 33 therein for selectively causing communication from vacuum tank 15 through conduit 16, and either conduit 18 or conduit 19 to the upper chamber 35 or lower chamber 45, respectively, of the fluid pressure motor 17.

When bell crank lever 30 is in the solid line position shown in the drawing, piston 34 of motor 17 is pulled upwardly because vacuum distributor valve 32 causes chamber 35 of motor 17 to communicate with the vacuum tank 15 through conduits 18 and 16. When such a condition exists the vehicle doors are locked.

When it is desired to unlock the vehicle doors from a remote positon, the knob 38 of manual operating rod 37, which protrudes through dashboard 39, is pushed inwardly to cause stem 40 to move to the right in FIG. 2. The end of shaft 40 then abuts latching lever 43 and causes it to swing clear of disc 29 by pivoting about pin 44 affixed to lever 30, and thereafter collar 41 on shaft 40 abuts upstanding arm 42 of bell crank lever 30. Because of the foregoing action, bell crank lever 30 pivots so that the vacuum distributing valve 32 is moved to its other position so as to cause communication between conduit 16, which is attached to the vacuum source 15, and conduit 19 which communicates with chamber 45 of motor 17. This causes piston 34 to move downwardly to move lever 21 to unlock the vehicle door.

If it is desired to lock the door, knob 38 is pulled to cause stem 40 to move to the left. Collar 49, which is affixed to stem 40, will then abut arm 42 of bell crank lever 30 and thereby cause it to pivot in a counterclockwise direction. The vacuum distributing valve 32 will then cause communication betwen conduits 16 and 18 to thereby actuate motor 17 to lock the vehicle door in the above described manner.

In the event that manual rod 37 has not been pulled to the left after the door has been unlocked, centering springs 50 and 51 will cause stem 40 to assume the intermediate position shown in the drawing after knob 38 has been released. However, bell crank lever 30, vacuum distributor valve 32, and latching lever 43 will still be in a door unlocking position as shown by dotted lines. In accordance with the present invention, the master control 14 causes automatic relocking of the vehicle doors in spite of the fact that knob 38 has not been fully pulled to the left. In this respect, it can be seen that when the automobile is accelerated from a standing position wherein the engine was idling, as occurs after a passenger is discharged without stopping the vehicle engine, a reduction of manifold suction within chamber 26 will permit spring 27 to expand and thereby cause diaphragm 24 and rod 28 to move downwardly. When this occurs, the disc 29, which is mounted on the end of shaft 28, will ride over the top inclined surface 46' of valve latch head 46 and cause it to pivot in a clockwise direction about pivot pin 44 against the bias of spring 47. Continued downward movement of rod 28 will cause disc 29 to reach a point where it will snap under the surface 52 of valve latch head 46. After the initial period of acceleration has terminated, the effect of increased manifold suction will cause flexible latch-locking diaphragm 24 to return to the position shown in the drawing and cause rod 28 and valve latch 43 to move upwardly a corresponding amount with the attendant result that the vacuum distributing valve 32 is returned to its solid line position. After this action has been completed, chamber 35 of motor 17 will again be in communication with vacuum source 15 to cause lever 21 to assume a door locking position.

The present invention causes automatic locking of the vehicle doors upon starting of the vehicle engine in the following manner: Prior to the starting of the engine, the expansion of spring 27 due to the lack of manifold suction will have caused the disc 29 to engage latch head 46. The return of manifold suction after the starting of the engine will result in the upward movement of diaphragm 24 and will cause the associated linkages to move distributor valve 32 to a position where it provides fluid pressure to lock the vehicle doors. Furthermore, once the doors have been locked, fluctations in manifold pressure will not cause the distributing valve 32 to cycle. This is possible because the reciprocation of disc 29 due to these fluctations will be confined to an area below latch head 46, which is in its uppermost positon when the doors are locked. It is also to be noted that the reciprocating movement of disc 29 due to fluctations in manifold pressure will not cause frictional wear between it and latching lever 43 because pin 48 limits the movement of lever 43 to the left to allow a clearance to exist between the stem of latching lever 43 and the side of disc 29. This structure provides in effect a one-way connection between the fluid motor diaphragm 24 and the valve lever 43.

In the event it is desired to unlock the vehicle doors from a remote position after the engine has been shut off, it is only necessary to move knob 38 to the right, as described in detail above, to cause communication between chamber 45 of motor 17 and vacuum tank 15 through conduits 16 and 19 and vacuum distributor valve 32. It will also be noted that the doors may be relocked after the engine is shut off by manipulating rod 37 to cause motor chamber 35 to communicate with vacuum tank 15 as described above.

While the motor 17 is shown as being operated from vacuum tank 15, it will be understood that it is within the scope of this invention to operate the motor 17 directly from the engine intake manifold or from any suitable source of fluid pressure, whether it be vacuum, compressed air, or hydraulic fluid.

Figure 4:
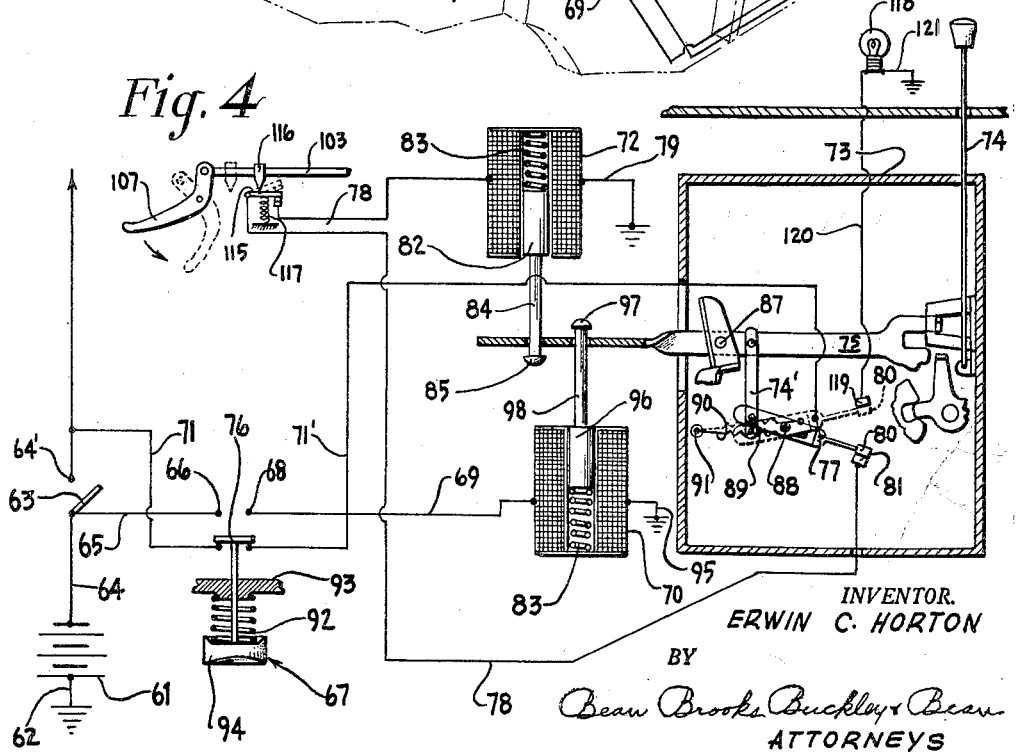
FIG. 4 is a schematic diagram, partly in cross section, depicting the salient features of the structure of FIG. 3.

In FIGS. 3 and 4 an electrical door locking arrangement is shown. An automobile body 60 is shown in phantom, and suitably mounted under the hood of the automobile is a battery 61 having one terminal thereof coupled to ground by lead 62 and the other terminal thereof coupled to ignition switch 63 by lead 64. The terminal of the ignition switch 63, which is coupled to lead 64, is also coupled by means of lead 65 to contact point 66 of switch 67. Coupled to terminal 68 of switch 67 are a plurality of conductors 69 which are coupled to door unlocking solenoids 70 which are positioned in the doors of the vehicle. Coupled to the terminal 64' of the ignition switch 63 is conductor 71 which is, in turn, coupled to conductors 71' connected to door locking solenoids 72 through the circuit which is described hereafter and shown in FIG. 4.

Positioned within each of the doors is a door latch-locking assembly 73 which may be of the same construction as latch-locking mechanism 22 shown in FIG. 5. Certain elements of the lock structure 22 shown in FIG. 5 are omitted from latch-locking structure 73 of FIG. 4 for the sake of clarity, and others have been added, as described hereafter. Manual door locking levers 74, which operate in the well known manner to lock the door when they are depressed, protrude from assembly 73. Also suitably coupled to each door latch-locking mechanism 73 is a lever 75, which serves the same function as lever 21 of FIG. 5, which is actuated by door unlocking solenoids 70 or door locking solenoid 72, as required.

After personnel have entered the vehicle it is desirable that all the door locks 73 be actuated to a locked position in order to prevent unauthorized intrusion into the vehicle. The structure of FIGS. 3 and 4 performs this feat automatically in an extremely simple manner. It can readily be seen from FIG. 4 that once ignition switch 63 is closed, a circuit is completed from battery 61 through lead 64, the armature of ignition switch 63, lead 71, armature 76 of switch 67, lead 71', switch 77, normally closed switch 115 (which is described in detail hereafter), lead 78, solenoid 72, and lead 79 to ground. It will be appreciated that when lever 75 is in the unlocked position, the terminals 80 and 81 of switch 77 will be engaged to permit the above described circuit to be completed because link 74', which is positioned between switch 77 and lever 75, causes switch 77 to assume its solid line position when lever 75 is in a position wherein it can unlock the lock 73. As the coil of solenoid 72 is energized, the armature 82 thereof will be pulled upwardly against the bias of spring 83. When this occurs shaft 84 which is affixed to armature 82 will likewise be pulled up and the head 85 of shaft 84 will engage lever 75 and cause it to pivot about pin 87 thereby pulling locking link 74 in a clockwise direction to prevent opening of the vehicle doors from the outside.

Once the door has been locked in the above described manner, it is desirable that the flow of electric current to coil of solenoid 72 be discontinued. To this end a snap switch 77 is provided. The armature of this switch pivots about pin 88 which is mounted on the lock housing, and one end of this switch is coupled to link 74' by means of connection 89. The other end of the switch armature mounts terminal 80. A spring 90 has one end thereof suitably affixed to the armature of switch 77 and the other end thereof suitably attached to a fixed point 91 on the casing of locking assembly 73. It can readily be seen that once link 74' is caused to move downwardly beyond the overcenter position of switch 77, as occurs when lever 75 is moved downwardly to a locking position, spring 90 will cause terminal 80 to separate from terminal 81 since armature 77 assumes the dotted line position shown in FIG. 4. Thus, once the solenoid 72 has caused door lock 73 to lock the door, the flow of current to solenoid coil 72 is automatically discontinued.

In order to insure that automatic locking and relocking occurs without any requirement for deliberate thinking on the part of the operator of the vehicle, armature 76 of lock actuating switch 67 is spring biased to a position where it completes a circuit to the coil of door locking solenoid 72 whenever the ignition switch is closed and the doors are unlocked. For this purpose, a compression spring 92 is interposed between the dashboard 93 of the automobile and the head 94 of switch 67 to bias switch 77 to the above-mentioned closed position.

If it is desired to unlock all of the automobile doors by use of switch 67, it is merely necessary to depress the latter against the bias of spring 92 to cause armature 76 thereof to engage contacts 66 and 68. When this occurs a circuit is completed from battery 61 through leads 64 and 65, armature 76 of switch 67, lead 69, the winding of solenoid 70 and lead 95 to ground. As a result of this action, the armature 96 of solenoid 70 will be pulled downwardly and the head 97 of shaft 98 which is attached to armature 96 will cause lever 75 to be rocked in a counter-clockwise direction about its pivot pin 87. After this occurs, the associated door locking linkage (not shown) is in a position which permits the door to be opened from outside of the vehicle.

Once the door has been unlocked in the above manner by the use of switch 67, and after the knob 94 of switch 67 is released, a circuit will again be completed through door locking solenoid 72 to automatically relock the door locks, provided of course, that ignition switch 63 is itself closed. Thus it can readily be seen that there is no possibility of the doors being unlocked so long as ignition switch 63 is closed, provided that switch 67 is not manually held in the door unlocking position.

If for any reason the doors have been unlocked and the ignition switch 63 is in the open position and it is desired to lock all of the automobile doors from a remote position, it is only necessary to momentarily close ignition switch 63 to thereby complete a circuit to the door locking solenoid 72 and thereby lock all of the automobile doors.

It will also be appreciated that the above described circuit permits the unlocking of all of the above-mentioned door locks even though the ignition switch 63 is in an "off" position. This is possible because lead 65 is coupled to battery 61 at all times, and thus door unlocking solenoid 70 may be energized by switch 67 at any time whether ignition switch 63 is on or off.

It will also be appreciated that master control 14 may be used to actuate door locking solenoids such as shown in FIGS. 3 and 4. If such operation is desired, it is only necessary to substitute appropriate electrical connections for the fluid distributor valve 32 so that the movement of bell crank lever 30 in response to fluctuations in manifold pressure will energize a door locking solenoid to provide automatic relocking of a vehicle door. This modification is within the scope of certain of the appended claims.

From FIG. 5 it will be noted that a lever 100 is pivotally mounted about pin 101 which extends from flange 102 which, in turn, extends in a substantially perpendicular direction from housing 12' of the latch-locking mechanism. Link 103 has one end thereof pinned, as at 104, to one end of lever 100, the other end of link 103 being connected to the inside door handle 107 (FIGS. 1, 2, and 4) of the automotive vehicle. Lever 100 has an extended portion 105 which extends about protruding lip 106 of lever 10'. Manipulation of the inside door handle will cause lever 100 to pivot about pin 101 and, in turn, cause portion 105 to engage lip 106 of lever 10' and thereby cause lever 10' to pivot in a clockwise direction about pin 11'. This action will, in turn, cause the portion of lever 10' which engages the slot of lever 22' to cause lever 22' to pivot in a counterclockwise direction about pin 23' thereby moving tongue 25' out of engagement with ratchet wheel 26'. In this manner, the door may be unlatched from the inside of the vehicle for permitting a person to alight therefrom even though the door was previously locked, as by pin 13'. It will also be noted that when lever 22' pivots in a counterclockwise direction, the upper end thereof will engage the bottom portion of lever 21 to thereby cause it to pivot counterclockwise about pin 17'. End 19' of lever 21 will therefore be placed in position to engage flange 20' of lever 10' to permit opening of the door from the outside, as described above.

It will readily be appreciated that when fluid motor 17 is actuated to a door locking position while the vehicle engine is in operation, the force applied to the inside door handle would normally have to overcome the vacuum in chamber 35 of motor 17 to permit opening of the door. However, a construction is provided which will permit the venting of the chamber 35 of fluid motor 17 when the door is opened from the inside by the use of inside door handle 107. From FIG. 2 it will be seen that link 103 is affixed to handle 107, link 103 also being affixed to lever 100 (FIG. 5) of the latch locking assembly. Handle 107 is biased by a spring (not shown) in a predetermined position when the handle is released. When it is desired to open a door from the inside, handle 107 is pivoted about pin 108 in the direction of the arrow. This will cause link 103 to move to the right in FIG. 2 (and move out of the plane of the drawing in FIG. 5) which, in turn, will cause the bottom portion of lever 100 to move out of the plane of the drawing. A spring (not shown) is provided between lever 100 and housing 12' for biasing the bottom part of lever 100 toward the plane of the drawing. This construction provides a certain amount of lost motion for lever 100. It is during this lost motion period after the initiating of movement of handle 107 that chamber 35 of motor 17 is vented to the atmosphere to prevent this motor from interfering with the door opening operation. More specifically, a link 125 (FIGS. 2 and 5) has one end thereof pivotally affixed to lever 100 and the other end thereof pivotally attached to bell crank lever 126 (FIG. 2) which is pivoted about pin 127. The other end of bell crank lever 126 is pivotally attached to rod 128 which mounts valve 129. When handle 107 is manipulated in the direction of the arrow, valve 129 will move downwardly off of its seat 130 in housing 131 against the bias of spring 132. It will be noted that housing 131 forms a part of fluid motor 17. When valve 129 moves off of its seat 130 during the initial portion of travel of handle 107, chamber 35 of motor 17 will be vented to the atmosphere through the clearance space between rod 128 and housing 131, the spring chamber of housing 131, and port 133. When the door handle is released, a spring (not shown) returns the door handle to its normal position and the other spring (not shown) which biases lever 100 will cause valve 129 to reseat on seat 130 through the intermediate linkage between the handle and the valve. This action is also aided by spring 132. When valve 129 is in its seated position, as it is whenever door handle 107 is released, motor 17 is in condition for a subsequent locking operation.

An analogous arrangement to that described above is shown in FIG. 4 for use with an electrical system. Switch 115 is placed in lead 78 leading to door locking solenoid 72. When inside door handle 107 is moved toward a door opening position, a dog 116 mounted on rod 103, which extends between handle 107 and lever 100 (FIG. 5) of the latch locking mechanism, permits switch 115 to open under the bias of spring 117 thereby disrupting the flow of current to door locking solenoid 72 prior to the time that lever 100 causes the door latch lock to be unlocked. This arrangement permits unlocking of the door by the use of the inside door handle without interference from door locking solenoid 72.

It is quite improbable that there would be times that the door could inadvertently be in an unlocked condition when the vehicle is in operation because of the inherent mode of operation of the automatic relocking feature of the present invention. However, it is always possible that some malfunction might cause the doors to be unlocked. Furthermore, there is always the distinct possibility that either an adult or a child in the rear of the vehicle may attempt to open a rear door while the vehicle is in motion. In either of the foregoing situations, it is desirable that the vehicle operator be informed of this fact. Therefore, a signal light 118 (FIGS. 3 and 4) is incorporated into the system. As can be seen from FIG. 4, a terminal 119 is fixedly mounted in the latch locking assembly. When the latch locking assembly is in an unlocked position, a circuit will be completed from the battery 61 through lead 64, ignition switch 63, lead 71, armature 76 of switch 67, lead 71′, the armature of switch 77, terminals 80 and 119, lead 120, signal lamp 118, and lead 121 to ground. It can thus be seen that whenever the latch locking assembly is in a position which will permit opening of the doors by the manipulation of the outside door handle, lamp 118 will be lit to inform the vehicle operator that the doors may be opened from the outside, or that a person in the rear of the vehicle has actuated the door handle to a door opening position. It will further be appreciated that other circuitry may be utilized to achieve the above desired results. While this warning system is not shown in FIG. 2, it will readily be appreciated that a simple series circuit between the automobile battery and a lamp 122 (FIG. 1) may be provided to light lamp 122 on the vehicle dashboard in response to the positioning of any element of the latch locking assembly in an unlocked position.

It will readily be appreciated that the embodiments of the invention heretofore described in FIGS. 1 through 5 will provide automatic relocking of the vehicle doors, as described in detail above. However, relative to the embodiment of FIGS. 1 and 2, there is always the possibility that the vehicle operator may lock himself out of the vehicle if he should be working on the running engine when all the vehicle doors are closed in that the manipulation of the throttle control underneath the vehicle hood will cause the master control 14 to recycle and thereby lock the doors. In order to obviate this possibility an interlock valve construction may be incorporated into the embodiment of FIGS. 1 and 2, a similar device being set forth in the copending application of J. R. Oishei et al., Serial No. 747,421, filed July 9, 1958 and now Patent No. 3,013,625. More specifically, valve 135 is positioned under the driver's portion of the seat 136 of the vehicle. When the driver is seated in the vehicle, the downward deflection of the seat will cause depression of stem 137 of valve 135 thereby permitting communication between hose sections 18 (FIGS. 1 and 2) which couple master control 14 to door locking piston 17. When the operator is seated, pistons 138 and 139 mounted on rod 137 will be in a position which permits communication between sections 18 of the hose thereby permitting functioning of the automatic relocking device of the present invention, as described in detail above. However, when the operator gets off the seat to leave the vehicle, pistons 138 and 139 will assume the position shown in FIG. 2 because of the biasing action of spring 140. Piston 139 will prevent communication between sections 18 of the hose between master control 14 and locking chamber 35 of motor 17. Chamber 141, which is in communication with the portion of hose 18 coupled to chamber 35 will be vented to the atmosphere through aperture 142 in the body of the seat valve 135. It will readily be appreciated, therefore, that once the operator has left the seat, as he must in order to leave the vehicle, the vacuum tank 15 will be prevented from communicating with chamber 35 of door locking motor 17 because the seat valve is in the position shown in FIG. 2. Because of this arrangement the operator will not be able to lock himself out of the vehicle.

An electrical circuit which is analogous to the above described pneumatic seat valve circuit may be incorporated into the embodiment of the invention shown in FIGS. 3 and 4 to prevent the vehicle operator from being locked out of the vehicle when the electrical relocking circuit is used. More specifically, all that is necessary is to place an electrical seat switch in series in lead 78 leading to door locking solenoid 72, this switch (not shown) being closed when the operator is sitting in the driver's seat thereby permitting the completion of a circuit to the door locking solenoids. However, this switch is open when the operator is not seated in the driver's seat thereby preventing the completion of the circuit to door locking solenoid 72 and thereby preventing the operator from being locked out of the vehicle.

It will readily be appreciated that under certain conditions a vehicle operator will start the vehicle before he closes his door or before a passenger closes one of the vehicle doors. In certain door locking arrangements of prior art the closing of the vehicle door subsequent to the starting of the engine resulted in the unlocking of the door when previously locked latchlocking mechanism engaged the latch retainer on the door jamb of the vehicle. The system of the present invention precludes such type of undesirable unlocking because the ability of the door locking motors to communicate with the source of fluid pressure in the embodiment of FIGS. 1 and 2 will cause automatic locking of the latch lock mechanisms notwithstanding the above mentioned conditions of operation. Thus the present invention provides a multiple automatic latch locking arrangement which not only insures the locking and maintaining of the doors locked under substantially all conditions of vehicle operation, but also insures that the doors are locked even if the vehicle engine is started before all of the vehicle doors are closed.

It will thus be seen that I have provided intrusion guards and remotely actuated locking and unlocking arrangements for the doors of automotive vehicles which are simple in construction, which are efficient and automatic in operation, and which are manifestly capable of achieving the above enumerated objects.

While I have described preferred embodiments of the present invention, I desire it to be understood that it is not limited thereto, but may be otherwise embodied within the scope of the following claims.

I claim:

1. In combination with a vehicle, an engine in said vehicle, a fluctuating source of fluid pressure in said vehicle, a door in said vehicle, a door lock for said door, motor means for actuating said door lock, control means for actuating said motor means to a door unlocking position, and an automatic relocking valve operatively coupled to said motor means comprising a chamber in said valve adapted to be coupled to said fluid pressure source, a member adapted to be motivated in response to fluctuations of fluid pressure in said chamber, and means for actuating said motor means to relock said door in response to a predetermined degree of fluctuation of fluid pressure in said chamber whether said engine ceases or continues operation after a door unlocking operation.

2. A door locking system for a motor vehicle having an engine with an intake manifold serving as a source of fluid suction when the engine is running, a power supply line to a second source of power, a door lock having a servo motor connected with the power supply line, valve means in said power supply line for selectively connecting the second source of power through said power supply line to said servo motor for operating the same to lock the door when the valve is moved to one position and to unlock the door when the valve is moved to a second position, and a master control mechanism including a fluid motor operatively connected to the fluid suction of the intake manifold and a manually operated valve operating mechanism, said manually operated valve operating mechanism having an operative connection with said valve means in said power supply line to manually operate same to actuate said valve in one position to lock the door and to a second position to unlock the door, and a one-way connection between the master control motor and said valve means to move the latter to a position for supplying power to said servo motor to a position to lock the door after said valve means has been manually moved to a position to supply power to said servo motor to unlock the door lock, whereby said door lock may be automatically locked by manifold suction under engine running conditions.

3. A door locking system according to claim 2 wherein the manually operated valve operating mechanism includes means for disconnecting the one-way connection between the master control motor and the valve means when operated to a second position to unlock the door lock.

4. A door locking system according to claim 2 wherein means are provided for normally moving the manually operated valve operating mechanism to a neutral position.

5. A door locking system according to claim 2 wherein the one-way connection between the master control motor and the valve means includes a latch rod carried by the master control fluid motor and a latching lever fixed to the valve means.

6. A door locking system according to claim 2 wherein the one-way connection between the master control motor and the valve means is disengaged when the manually operated valve operating mechanism is operated to a position to move the valve means to a position to unlock the door lock.

References Cited in the file of this patent
UNITED STATES PATENTS

| | | |
|---|---|---|
| 2,198,862 | Chesler | Apr. 30, 1940 |
| 2,340,424 | Ott | Feb. 1, 1944 |
| 2,344,826 | LeGresley | Mar. 21, 1944 |
| 2,505,401 | Ingres et al. | Apr. 25, 1950 |
| 2,530,628 | Pivero | Nov. 21, 1950 |
| 2,716,568 | Davies | Aug. 30, 1955 |
| 2,834,420 | Guess | May 13, 1958 |
| 2,936,843 | Adams et al. | May 17, 1960 |